US012673655B2

(12) United States Patent
Kim

(10) Patent No.: US 12,673,655 B2
(45) Date of Patent: Jul. 7, 2026

(54) ELECTRO-MECHANICAL BRAKE

(71) Applicant: HL MANDO CORPORATION, Pyeongtaek-si (KR)

(72) Inventor: Jinseok Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 868 days.

(21) Appl. No.: 18/085,849

(22) Filed: Dec. 21, 2022

(65) Prior Publication Data

US 2023/0192058 A1 Jun. 22, 2023

(30) Foreign Application Priority Data

Dec. 22, 2021 (KR) ........................ 10-2021-0185447

(51) Int. Cl.
*B60T 13/74* (2006.01)
*F16D 55/226* (2006.01)
(Continued)

(52) U.S. Cl.
CPC .......... *B60T 13/746* (2013.01); *F16D 55/226* (2013.01); *F16D 65/18* (2013.01); (Continued)

(58) Field of Classification Search
CPC ...... B60T 13/746; F16D 65/18; F16D 55/226; F16D 2121/24; F16D 2125/40; F16H 7/02; F16H 7/06; F16H 7/08; F16H 25/2018
See application file for complete search history.

(56) References Cited

U.S. PATENT DOCUMENTS 10,794,442 B2 * 10/2020 Ross ........................ F16D 65/16
2004/0016607 A1 * 1/2004 Drennen ................. F16D 65/18
188/72.8

(Continued)

FOREIGN PATENT DOCUMENTS

CN 103620255 A 3/2014
DE 102006040129 A1 * 1/2008 ............. F16D 65/18
(Continued)

OTHER PUBLICATIONS

Office Action From Chinese Patent Office Dated Feb. 12, 2026 Issued for Corresponding Chinese Patent Application.

*Primary Examiner* — Vishal R Sahni
(74) *Attorney, Agent, or Firm* — Harvest IP Law, LLP

(57) ABSTRACT

Disclosed is an electro-mechanical brake which is compact due to a changed structure of a power transmission part. According to one aspect of the present invention, there is provided an electro-mechanical brake provided with a pair of brake pads disposed at both sides of a disc, the electro-mechanical brake including a driving motor, a first rotating part assembled with a rotating shaft of the driving motor, a second rotating part driven while connected to the first rotating part through a driving transmission member, a nut driving part rotationally driven while connected to the second rotating part so that power is transmitted to the second rotating part, and a screw driving part which is installed inside and engaged with the nut driving part and driven forward or backward according to a rotation direction of the nut driving part so that a piston pushes the brake pads to come into close contact with the disc, wherein one end of the screw driving part is assembled with the piston, the other end of the screw driving part passes through the driving transmission member and is disposed between the first rotating part and the second rotating part to move forward or backward.

18 Claims, 9 Drawing Sheets

(51) Int. Cl.
    F16D 65/18        (2006.01)
    *F16D 121/24*     (2012.01)
    *F16D 125/40*     (2012.01)
    *F16D 125/44*     (2012.01)
    *F16D 125/48*     (2012.01)

(52) U.S. Cl.
    CPC ...... *F16D 2121/24* (2013.01); *F16D 2125/40*
         (2013.01); *F16D 2125/44* (2013.01); *F16D*
                      *2125/48* (2013.01)

(56)               References Cited

U.S. PATENT DOCUMENTS

2004/0124042 A1*   7/2004   Kriz, II ................... F16D 65/18
                                     188/162
2004/0195058 A1*  10/2004   Ina .......................... F16D 65/18
                                     188/158
2009/0050420 A1*   2/2009   Poertzgen ............. B60T 13/746
                                     188/156
2019/0023248 A1*   1/2019   Yasui ................... B60T 13/741
2019/0242448 A1*   8/2019   Ross ..................... B60T 13/746

FOREIGN PATENT DOCUMENTS

DE       102012217275 A1 *  3/2013   .............. F16H 1/28
WO       2007104505 A1    9/2007

* cited by examiner

【Fig. 1】
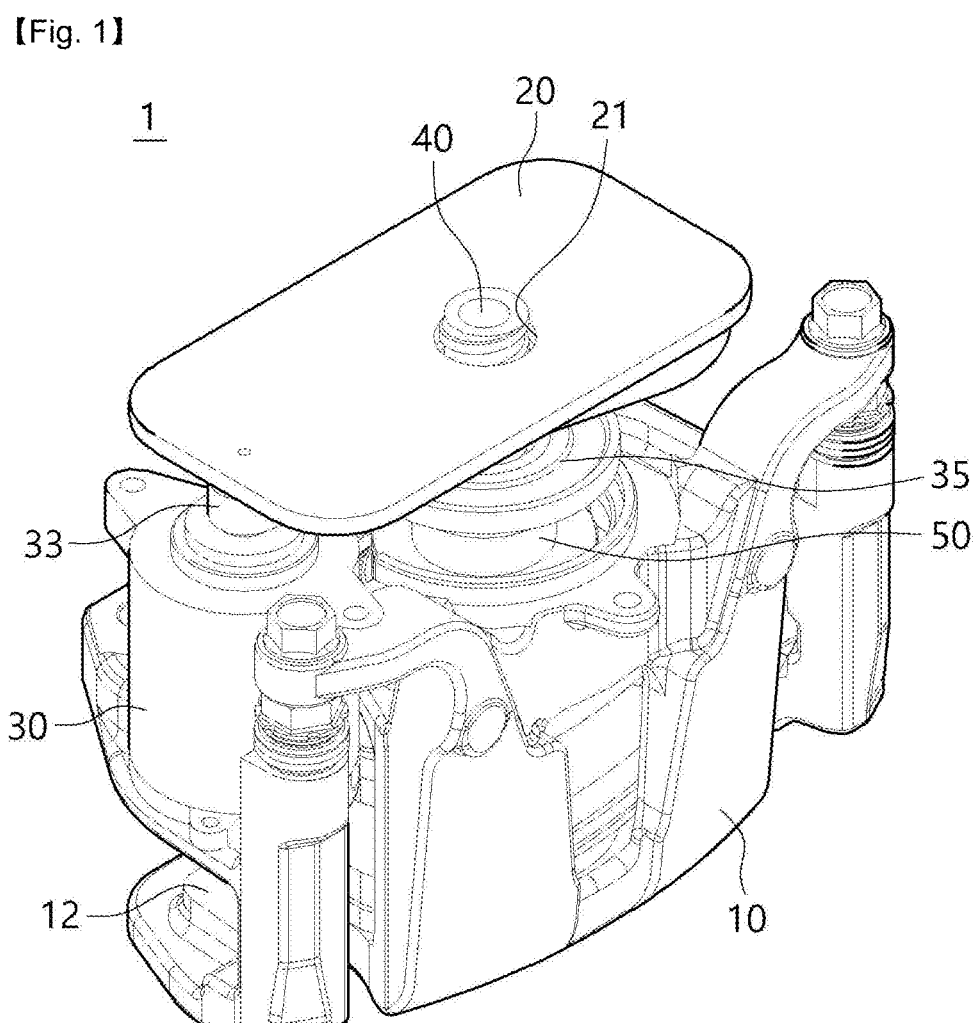

【Fig. 2】
1
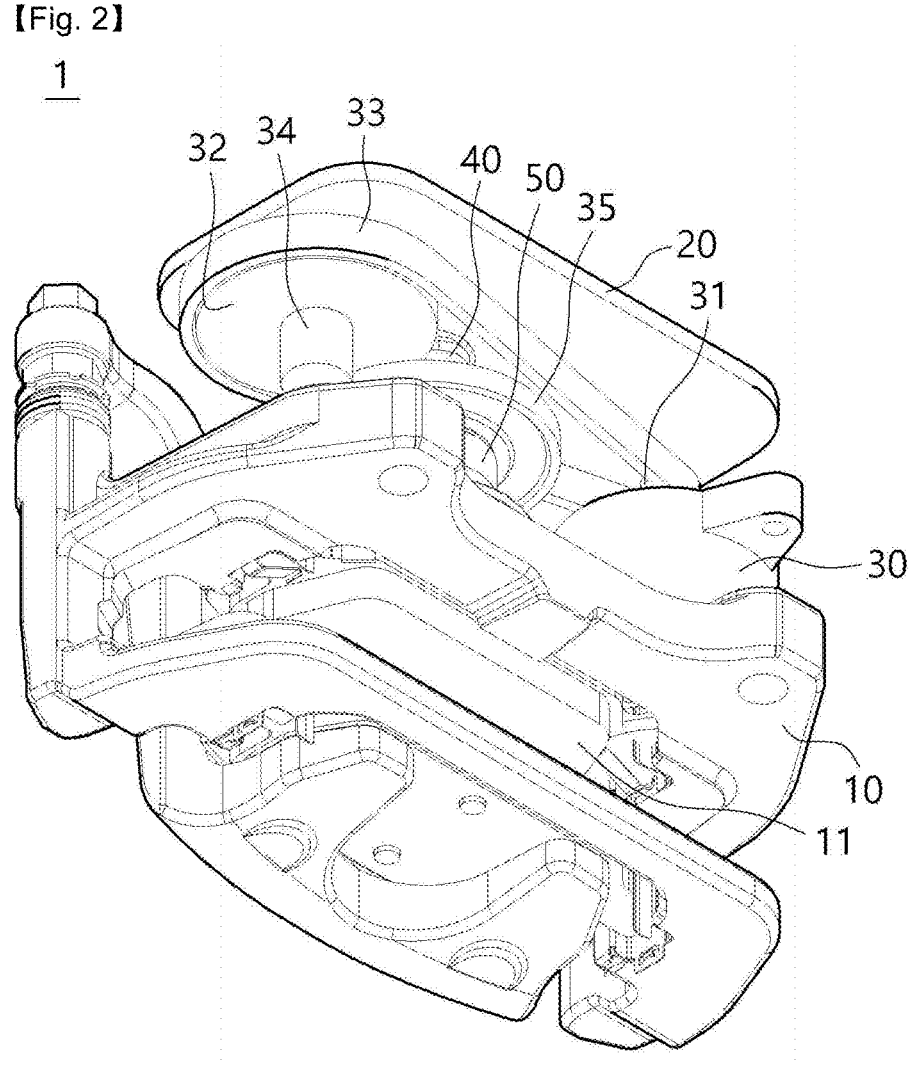

【Fig. 3】
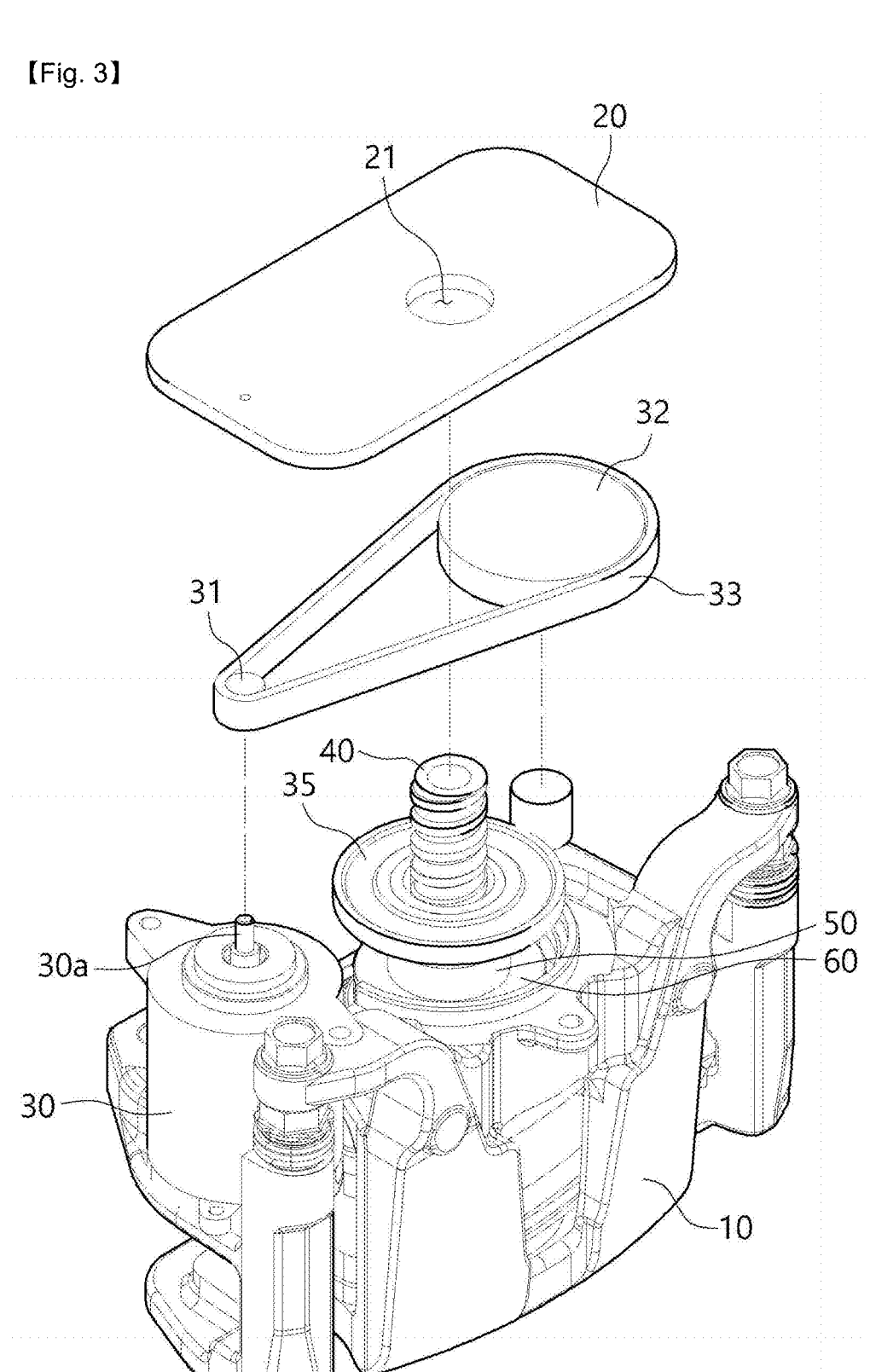

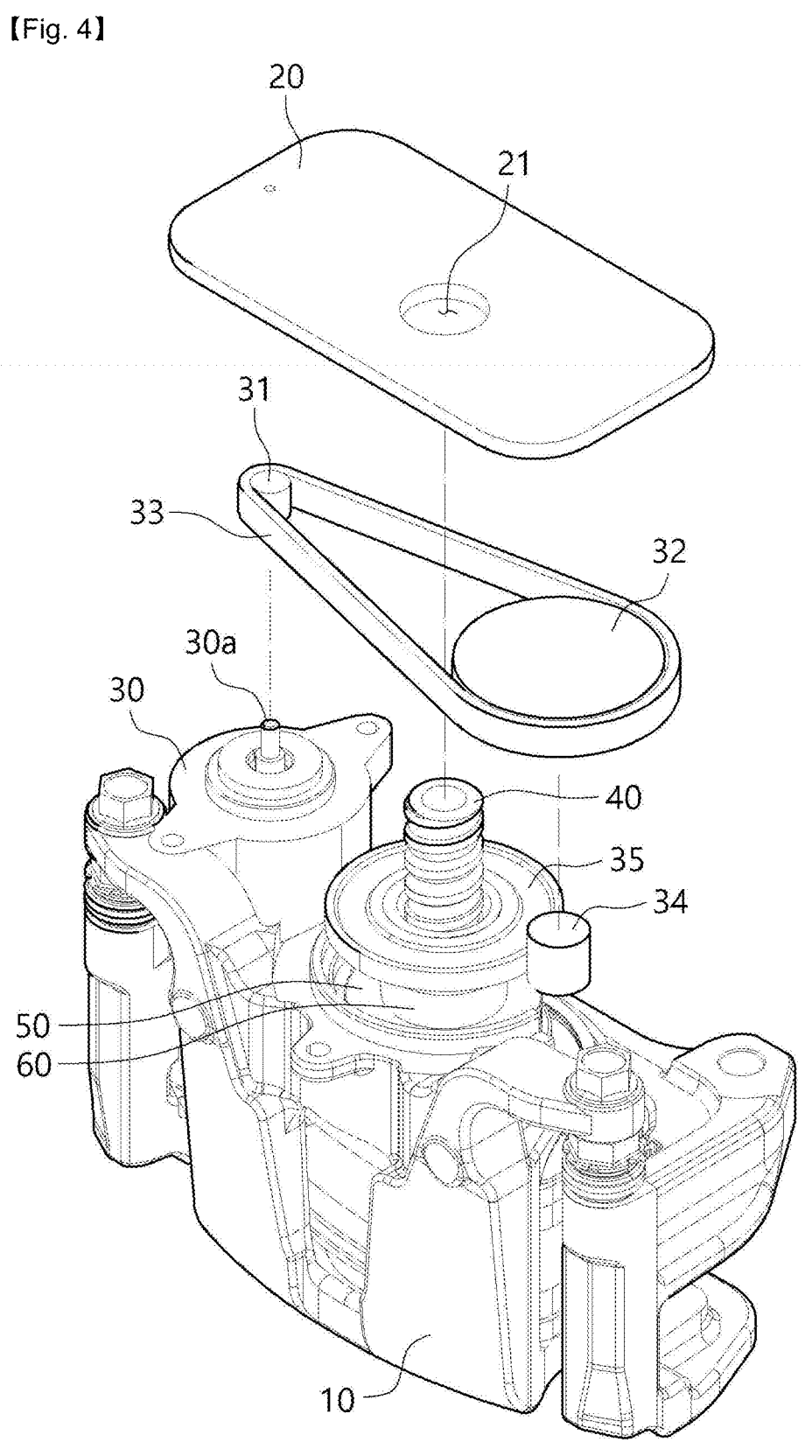

【Fig. 4】

【Fig. 5】
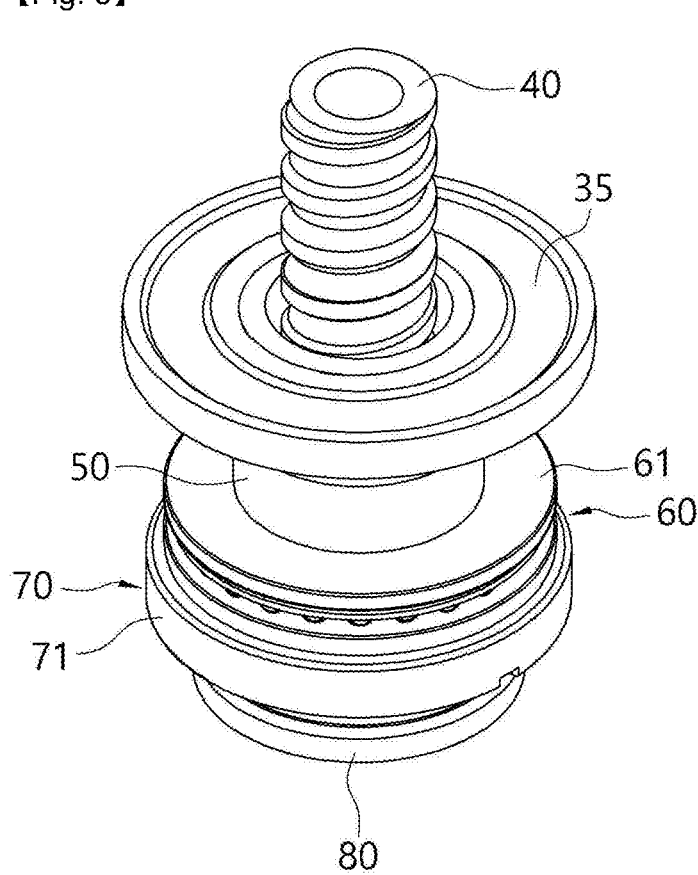

【Fig. 6】
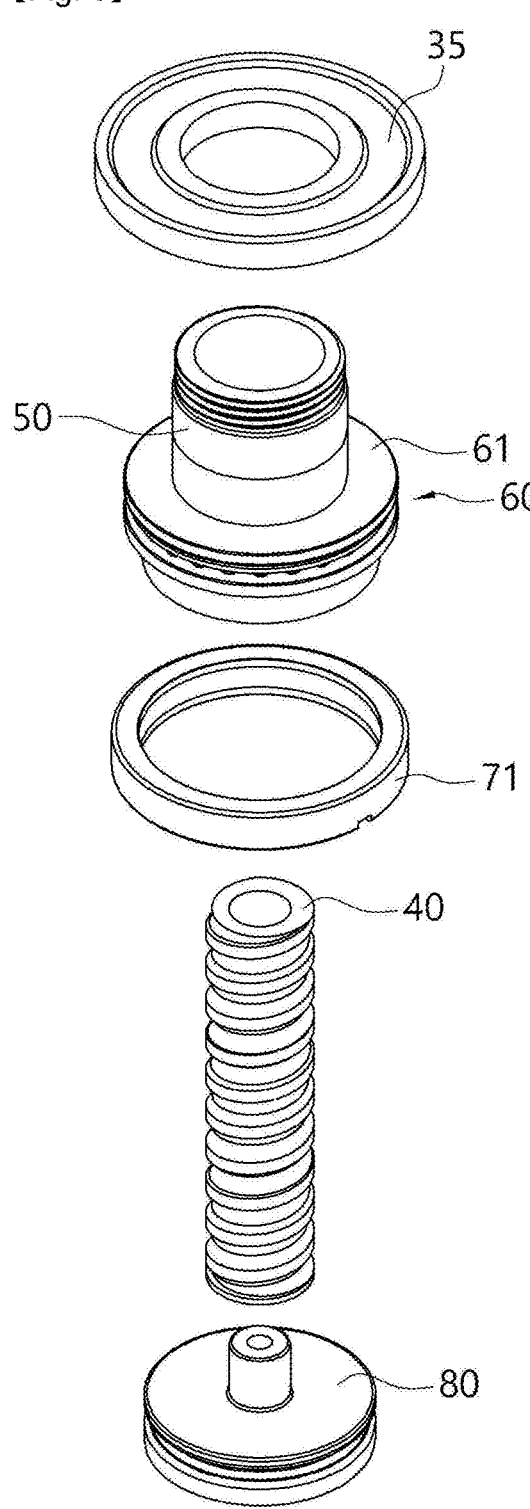

【Fig. 7】
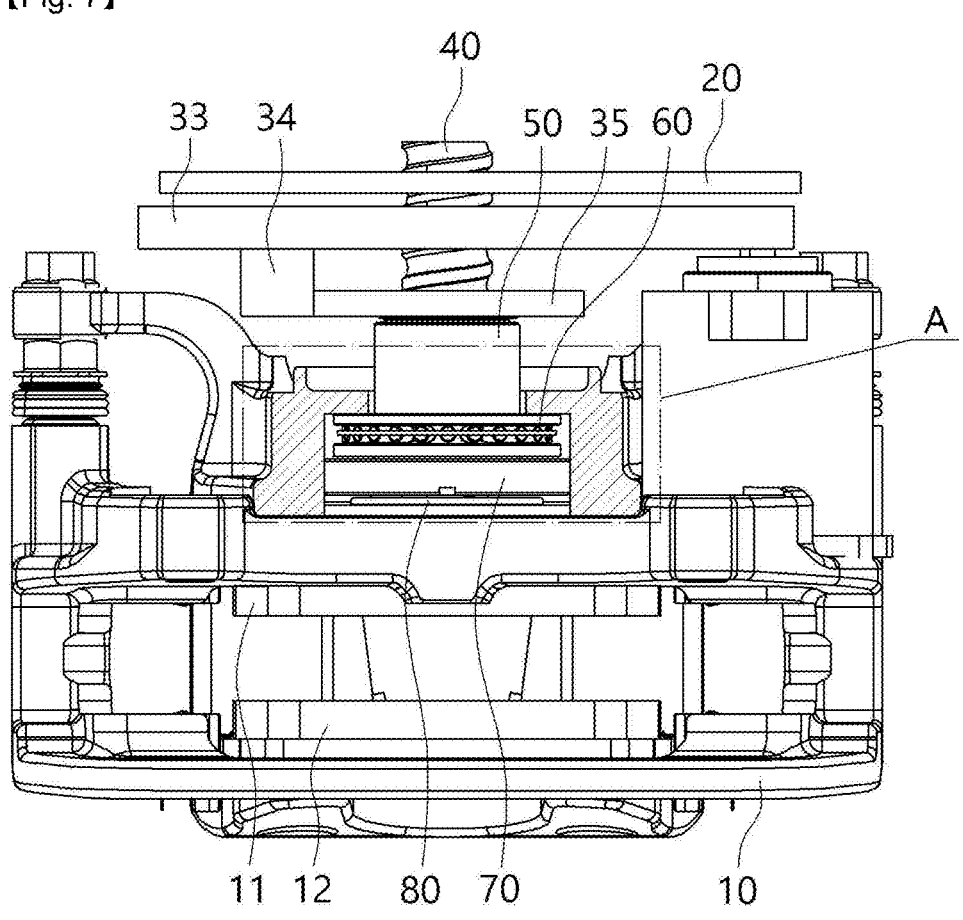
【Fig. 8】
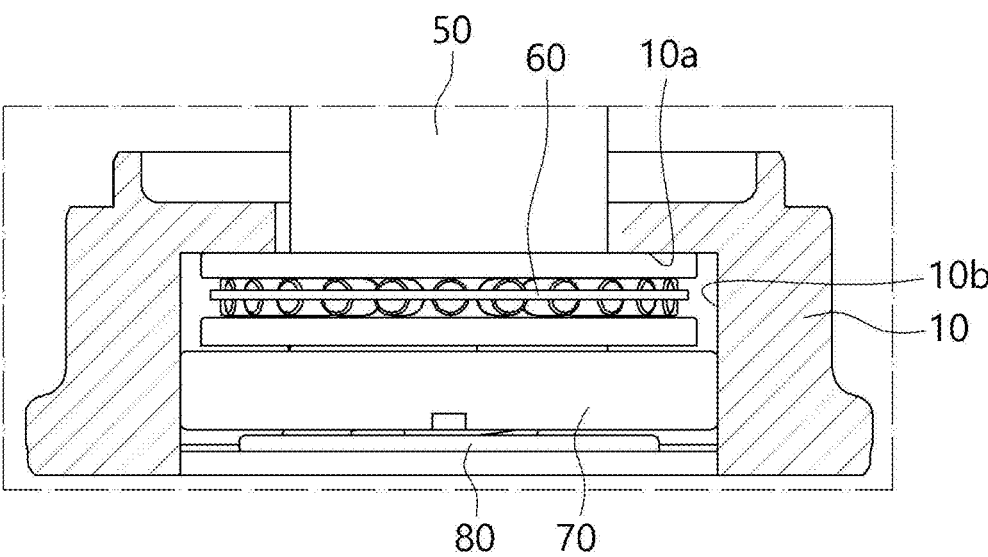

【Fig. 9】
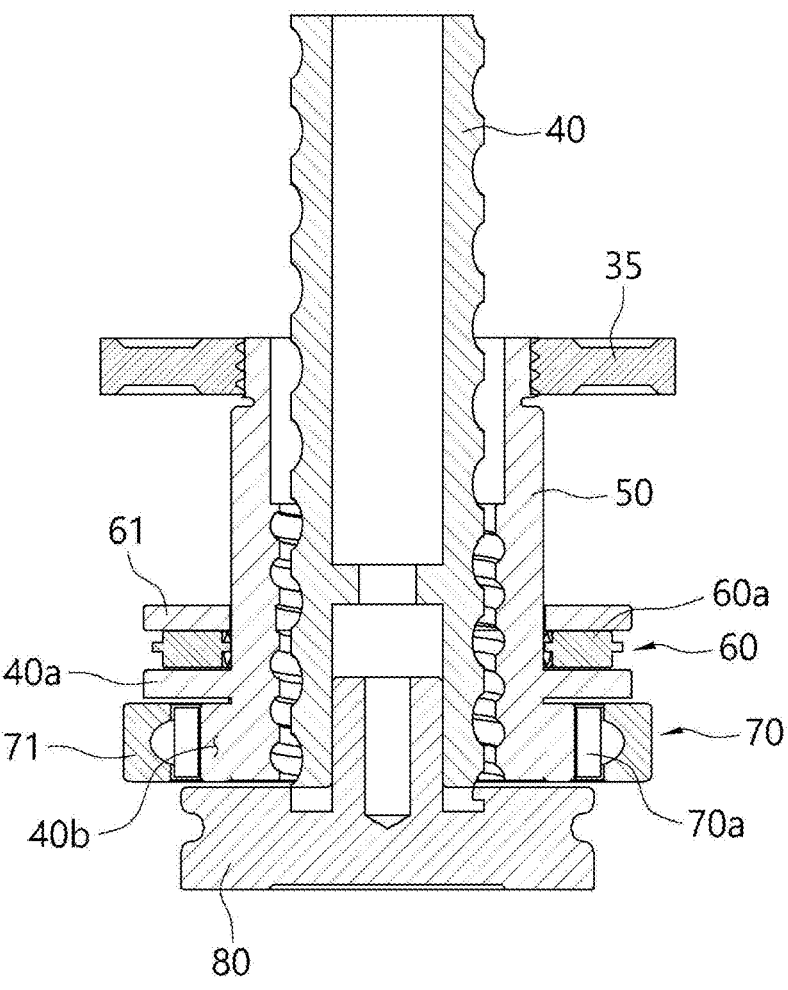
【Fig. 10】
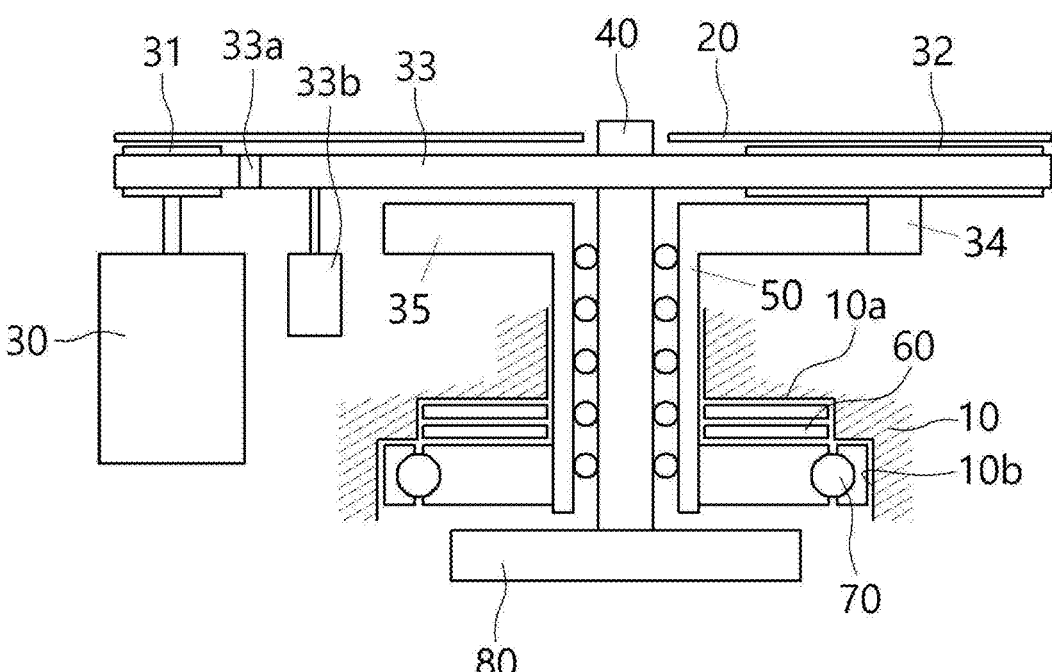

【Fig. 11】
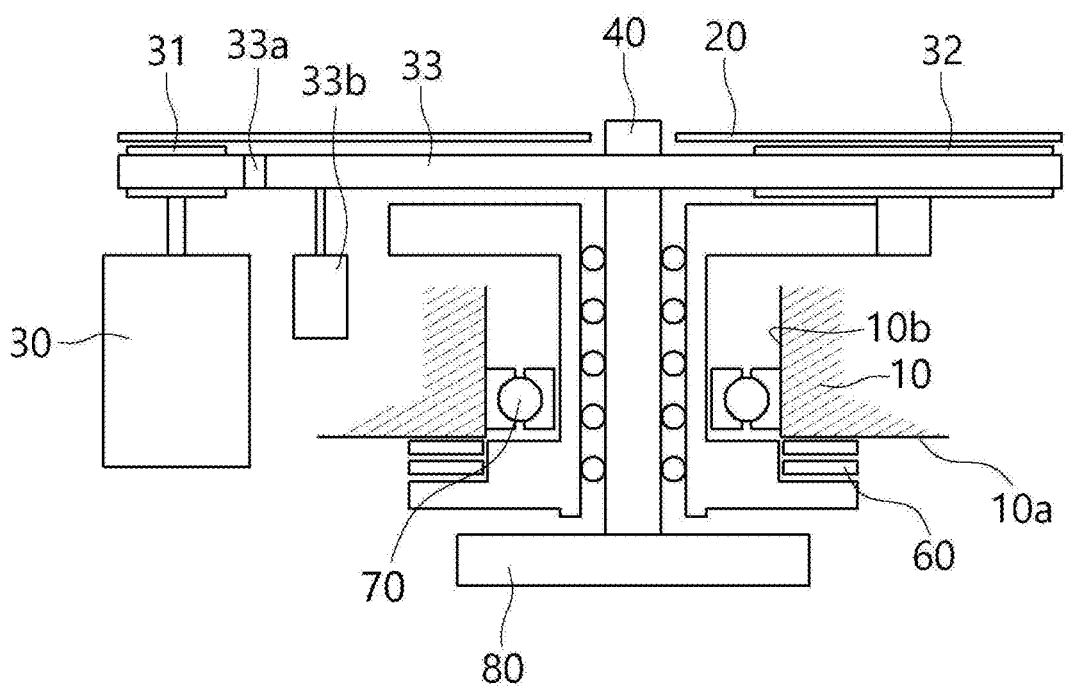

ELECTRO-MECHANICAL BRAKE

CROSS-REFERENCE TO RELATED APPLICATION

This application claims priority to and the benefit of Korean Patent Application No. 10-2021-0185447, filed on Dec. 22, 2021, the disclosure of which is incorporated herein by reference in its entirety.

BACKGROUND

1. Field of the Invention

The present invention relates to an electro-mechanical brake, and more specifically, to an electro-mechanical brake which is compact due to a changed structure of a power transmission part.

2. Discussion of Related Art

In general, a brake system is a system for stopping movement of a vehicle during braking or parking and serve to hold wheels of the vehicle so that the wheel does not rotate.

Recently, electro-mechanical brake (EMB) systems which electronically control driving of brakes have been developed. Since such EMBs can be operated through a manual operation of a driver and also automatically operated in the case of vehicles having an autonomous driving system, the EMBs are very convenient and can realize upgrading of the vehicle.

Among such EMBs, in the case of EMBs which provide a braking force to a vehicle by pressing a disc, rotation of the disc is controlled by transmitting a rotational driving force of a motor to a screw-coupled screw and nut structure and pressing the disc using a screw or nut.

In this case, since the rotational driving force of the motor cannot be directly transmitted to the screw or nut, power is transmitted from the motor to the screw or nut using a plurality of gears for deceleration, and since, in the conventional EMB, gears which transmit power are disposed in a row, a load due to a rotational force is applied greatly, and thus there is a problem of degrading durability.

The EMB based on the conventional technique generally has a structure which supports a clamp force on a bottom surface of a caliper housing bore, such a structure has a problem of being disadvantageous for mounting because a product is as long in an axial direction as a thickness of a bottom of a housing, and when the housing is deformed, since an inner spindle receives a bending stress, the structure has a problem of being disadvantageous in terms of efficiency, strength, and durability.

SUMMARY OF THE INVENTION

The present invention is intended to address the above problems and directed to providing an electro-mechanical brake which is compact due to a changed structure of both of a power transmission part which transmits power of a motor and a bearing structure supporting the structure of the power transmission part to reduce an entire volume.

Objectives of the present invention are not limited to the above-described objectives, and other objectives which are not described will be clearly understood by those skilled in the art from the following description.

According to an aspect of the present invention, there is provided an electro-mechanical brake provided with a pair of brake pads disposed at both sides of a disc, the electro-mechanical brake including a driving motor, a first rotating part assembled with a rotating shaft of the driving motor, a second rotating part driven while connected to the first rotating part through a driving transmission member, a nut driving part rotationally driven while is connected to the second rotating part so that power is transmitted to the second rotating part, and a screw driving part which is installed inside and engaged with the nut driving part and driven forward or backward according to a rotation direction of the nut driving part so that a piston pushes the brake pads to come into close contact with the disc, wherein one end of the screw driving part is assembled with the piston, the other end of the screw driving part passes through the driving transmission member and is disposed between the first rotating part and the second rotating part to move forward or backward.

According to another aspect of the present invention, there is provided an electro-mechanical brake provided with a pair of brake pads disposed at both sides of a disc, the electro-mechanical brake including a driving motor, a first rotating part assembled with a rotating shaft of the driving motor, a second rotating part driven while connected to the first rotating part through a driving transmission member, a screw driving part rotationally driven while connected to the second rotating part so that power is transmitted to the second rotating part, and a nut driving part installed outside and engaged with the screw driving part and driven forward or backward according to a rotation direction of the screw driving part so that a piston pushes the brake pads to come into close contact with the disc, wherein one end of the nut driving part is assembled with the piston, and the other end of the nut driving part passes through the driving transmission member and is disposed between the first rotating part and the second rotating part to move forward or backward.

The first rotating part and the second rotating part may be positioned coplanar with each other.

A diameter of the first rotating part may be smaller than a diameter of the second rotating part.

The driving transmission member connecting the first rotating part and the second rotating part may be a belt or chain.

A driving gear may be fixedly installed on an outer surface of the nut driving part or the screw driving part, and a pinion (34) engaged with the driving gear may be fixedly installed on a lower portion of the second driving part.

A diameter of the driving gear may be greater than or equal to a diameter of the second rotating part.

The electro-mechanical brake may further include a tensioner which provides a tension to the driving transmission member.

A printed circuit board (PCB) may be disposed parallel to the driving transmission member, and a through hole through which the screw driving part or the nut driving part passes may be formed in the PCB.

A bearing member may be disposed on the outer surface of the nut driving part to reduce rotational friction with a body of a housing.

The bearing member may be a thrust bearing or radial bearing.

A jaw portion may be formed on the body of the housing, a thrust bearing may be installed on a portion of the jaw portion vertically in close contact with the body of the housing, and a radial bearing may be installed on a portion of the jaw portion laterally in close contact with the body of the housing.

The nut driving part and the screw driving part may each be a ball nut and a ball screw.

According to still another aspect of the present invention, there is provided an electro-mechanical brake provided with a pair of brake pads disposed at both sides of a disc, the electro-mechanical brake including a driving motor, a power transmission part which transmits a driving force of the driving motor, a nut driving part rotationally driven while connected to the power transmission part so that power is transmitted to the power transmission part, and a screw driving part which is installed inside and engaged with the nut driving part and driven forward or backward according to a rotation direction of the nut driving part and has one end assembled with a piston to push the brake pads to come into close contact with the disc and the other end installed to pass through the power transmission part, wherein a bearing member is disposed on an outer surface of the nut driving part to reduce rotational friction with a body of a housing.

The bearing member may be a thrust bearing or radial bearing.

A jaw portion may be formed on the body of the housing, the thrust bearing may be installed on a portion of the jaw portion vertically in close contact with the body of the housing, and the radial bearing may be installed on a portion of the jaw portion laterally in close contact with the body of the housing.

According to yet another aspect of the present invention, there is provided an electro-mechanical brake provided with a pair of brake pads disposed at both sides of a disc, the electro-mechanical brake including a driving motor, a power transmission part which transmits a driving force of the driving motor, a nut driving part rotationally driven while connected to the power transmission part so that power is transmitted to the power transmission part, and a screw driving part which is installed inside and engaged with the nut driving part and driven forward or backward according to a rotation direction of the nut driving part and has one end assembled with a piston to push the brake pads to come into close contact with the disc and the other end installed to pass through the power transmission part, wherein a bearing member is disposed on an outer surface of the nut driving part to reduce rotational friction with a body of a housing, a corner portion of the housing is disposed close to the outer surface of the nut driving part, and a thrust bearing and a radial bearing are sequentially disposed in order close to the piston.

BRIEF DESCRIPTION OF THE DRAWINGS

Not only detailed descriptions of exemplary embodiments of the present invention described below but also the summary described above will be understood more easily when read with reference to the accompanying drawings. The exemplary embodiments are illustrated in the drawings to illustrate the present invention. However, it should be understood that the present invention is not limited to the exact layout and method illustrated in the drawings, in which:

FIGS. 1 and 2 are perspective views illustrating an electro-mechanical brake according to one embodiment of the present invention.

FIGS. 3 and 4 are partially exploded perspective views illustrating the electro-mechanical brake according to one embodiment of the present invention.

FIG. 5 is a perspective view illustrating a state in which a nut driving part and a screw driving part, which are components of the electro-mechanical brake, are assembled according to one embodiment of the present invention.

FIG. 6 is an exploded perspective view illustrating the nut driving part and the screw driving part illustrated in FIG. 5.

FIG. 7 is a partial cross-sectional view illustrating the electro-mechanical brake according to one embodiment of the present invention.

FIG. 8 is an enlarged detailed view illustrating portion A in FIG. 7.

FIG. 9 is a vertical cross-sectional view illustrating the nut driving part and the screw driving part which are the components of the electro-mechanical brake according to one embodiment of the present invention.

FIG. 10 is a schematic view illustrating the electro-mechanical brake according to one embodiment of the present invention.

FIG. 11 is a schematic view illustrating an electro-mechanical brake according to another embodiment of the present invention.

DETAILED DESCRIPTION OF EXEMPLARY EMBODIMENTS

Hereinafter, embodiments of the present invention will be described in detail with reference to the accompanying drawings in order for those skilled in the art to easily implement the present invention. The present invention may be implemented in various different forms and is not limited to the embodiments described herein. Parts irrelevant to description are omitted in the drawings in order to clearly explain the present invention, and the same or similar parts are denoted by the same reference numerals throughout this specification.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of the terms in order to describe the invention in the best way.

Accordingly, since the embodiment described in this specification and configurations illustrated in the drawings correspond to one exemplary embodiment and do not represent the overall technological scope of the invention, the corresponding configuration may cover various equivalents and modifications that can substitute for the embodiments and drawings herein at the time of filing of this application.

It should be further understood that the terms "comprise," "include," or the like, when used herein, specify the presence of stated features, numbers, steps, operations, elements, components, or groups thereof but do not preclude the presence or addition of one or more other features, numbers, steps, operations, elements, components, or groups thereof.

A case in which a certain component is disposed "in front of," "behind," "above," or "under" another component includes not only a case in which the component is disposed "in front of," "behind," "above," or "under" another component to be directly close to another component but also a case in which still another component is disposed therebetween as long as there is no particular situation. In addition, a case in which a certain component is "connected" to another component includes not only a case in which they are "directly connected" but also a case they are "indirectly connected" as long as there is no particular situation.

Hereinafter, an electro-mechanical brake 1 according to one embodiment of the present invention will be described with reference to the accompanying drawings.

Referring to FIGS. 1 to 10, the electro-mechanical brake 1 according to one embodiment of the present invention may include a driving motor 30, a first rotating part 31, a second rotating part 32, a screw driving part 40, and a nut driving part.

First, the electro-mechanical brake 1 according to one embodiment of the present invention is an electro-mechanical brake having a pair of brake pads 11 and 12 disposed at both sides of a disc. In this case, the screw driving part 40 is driven forward or backward, a piston 80 is assembled with the screw driving part 40 so that the brake pads 11 and 12 are operated to come into close contact with or be separated from the disc according to driving of the screw driving part 40.

Referring to FIGS. 1 to 4, the driving motor 30 is fixed at one side of a housing 10 and operated according to an electrical signal transmitted from a brake pedal.

In this case, the driving motor 30 is installed so that a rotating shaft 30a thereof is disposed parallel to a rotating shaft of the screw driving part 40 and a nut driving part 50. In addition, the driving motor 30 is disposed at a side of the screw driving part 40. However, a length of the driving motor 30 is smaller than a length of the screw driving part 40, and the driving motor 30 and the screw driving part 40 do not interfere with each other when operating.

In this case, the rotating shaft 30a of the driving motor 30 may be installed parallel to the rotating shaft of the first and second rotating bodies, which transmit power, as well.

Referring to FIGS. 2 to 4, the first rotating part 31 may be rotationally driven while assembled with the rotating shaft of the driving motor 30.

Referring to FIGS. 2 to 4, the second rotating part 32 may be connected to the first rotating part 31 through a driving transmission member 33.

In this case, the first rotating part 31 and the second rotating part 32 may be positioned coplanar with each other. However, the first rotating part 31 and the second rotating part 32 may also be positioned on different planes according to a situation when designing, but it can be most efficient for the first rotating part 31 and the second rotating part 32 to be positioned coplanar with each other.

In this case, a diameter of the first rotating part 31 may be smaller than a diameter of the second rotating part 32. Such a gear ratio may be changed according to a design.

In this case, the driving transmission member 33 connecting the first rotating part 31 and the second rotating part 32 may be a belt or chain. In this case, it is illustrated that the belt is applied as the driving transmission member 33. However, in the case of the chain, the chain may also be applied thereto because there is the same spatial advantage, and a timing belt may also be applied thereto in the same manner. The important point is that any power transmission component may be employed as long as a space, through which the forward and backward driving member, in this case, the screw driving part 40, which moves forward or backward may pass through and operate, is provided.

In this case, referring to FIG. 10, a tensioner 33a, which provides a tension to the driving transmission member 33, and a parking coil 33b may be further included.

Referring to FIGS. 1 to 10, the nut driving part 50 may be rotationally driven while connected to the second rotating part 32 so that power is transmitted to the second rotating part 32.

Referring to FIGS. 1 to 10, the screw driving part 40 may be installed in and engaged with the nut driving part 50 and driven forward or backward according to a rotation direction of the nut driving part 50 so that the piston 80 may push the brake pads 11 and 12 to come into close contact with the disc.

In this case, the nut driving part 50 and the screw driving part 40 may be a ball nut and a ball screw. It is preferable that a ball screw including a ball therein is applied thereto so that smooth driving transmission can be performed, and a loss due to friction can be reduced.

In this case, one end of the screw driving part 40 may be disposed between the first rotating part 31 and the second rotating part 32 so that the piston 80 is assembled with one end of the screw driving part 40 and the other end passes through the driving transmission member 33 and moves forward or backward. Due to such a layout, a compact design and a mechanism design are possible.

In this case, a driving gear 35 may be fixedly installed on an outer surface of the nut driving part 50, and a pinion 34 engaged with the driving gear 35 may be fixedly installed on a lower portion of the second rotating part 32. Due to such a structure, a driving force of the first rotating part 31 is transmitted to the nut driving part 50 through the pinion 34 and the driving gear 35.

Eventually, a rotational driving force of the driving motor 30 may rotationally drive the nut driving part 50 through the first rotating part 31, the second rotating part 32, the pinion 34, and the driving gear 35. However, the screw driving part 40 engaged with the nut driving part 50 may be driven forward or backward by rotational driving of the nut driving part 50.

In this case, a diameter of the driving gear 35 may be greater than or equal to the diameter of the second rotating part 32. However, such a gear ratio may be changed during designing.

In this case, a bearing member may be disposed on the outer surface of the nut driving part 50 to reduce rotational friction with a body of the housing 10.

In this case, the bearing member may be a thrust bearing 60 or a radial bearing 70.

In this case, referring to FIG. 10, a jaw portion may be formed on the body of the housing 10, the thrust bearing 60 may be installed on a portion of the jaw portion in vertically close contact with the body of the housing 10, and the radial bearing 70 may be installed on a portion of the jaw portion in laterally close contact with the body of the housing 10. That is, based on FIG. 10, the thrust bearing 60 and the radial bearing 70 may be sequentially installed from above.

In this case, by arranging the bearings in this order, since the body of the housing 10 may be positioned near the nut driving part 50 in a space above the bearings, spatial utilization can be increased.

In this case, referring to FIGS. 1 to 4, a printed circuit board (PCB) 20 may be disposed parallel to the driving transmission member 33, and a through hole 21, through which the screw driving part 40 or the nut driving part 50 may pass, may be formed in the PCB 20. That is, since the PCB 20 may be installed closer to positions of the first and second rotating bodies than an original position thereof, it is advantageous for reducing a space. However, such a structure of the PCB 20 may be applied when the screw driving part 40 is installed to pass through the driving transmission member 33.

Referring to FIGS. 1 and 2, the driving motor 30 is disposed at one side of the housing 10, and the screw driving part 40 is installed to pass through the driving transmission member 33 and the PCB 20 at a central portion thereof. When compared to the screw driving part 40 which is longest, since other components are disposed at a lower level, a compact motor can be made. In FIG. 2, driving of the driving motor 30 may be transmitted to the nut driving part 50 through the first rotating part 31, the driving transmission member 33, the second rotating part 32, the pinion 34, and the driving gear 35. Accordingly, the screw driving part 40 engaged with the nut driving part 50 is driven forward or backward, the brake pads 11 and 12 are pushed by the piston 80 assembled with the screw driving part 40 to press the disc, and thus a brake operates.

Referring to FIGS. 3 and 4, the first rotating part 31 is assembled with the rotating shaft 30a of the driving motor 30. The second rotating part 32 is assembled to be connected to the first rotating part 31 through the driving transmission member 33, and a rotational driving force of the first rotating part 31 is transmitted to the second rotating part 32. The pinion 34 is assembled with the lower portion of the second rotating part 32. However, the pinion 34 may also be integrally formed with the second rotating part 32. In this case, the second rotating part 32 and the pinion 34 may be rotatably supported by a part of the housing 10. The driving gear 35 may be engaged with the pinion 34. As the driving gear 35 is assembled with the nut screw, a rotational driving force of the driving motor 30 may rotationally drive the nut driving part 50.

Referring to FIGS. 5 and 6, a rotational driving force of the driving gear 35 rotationally drives the nut driving part 50, and as a result, the screw driving part 40, which is screw-connected to the nut driving part 50 in a ball screw manner, may be driven forward or backward according to a rotational driving direction of the nut driving part 50. Since the piston 80 is assembled with an end portion of the screw driving part 40 in FIG. 9, the screw driving part 40 moves forward or backward with the piston 80. In this case, since the piston 80 is non-rotatably assembled with the housing 10, the screw driving part 40 may move only forward or backward. In addition, the thrust bearing 60 and the radial bearings 70 are sequentially disposed.

Referring to FIGS. 7 to 9, a cross-section of a part of the housing 10 is illustrated. An inner horizontal surface of a part of the housing 10 may be in close contact with an upper member 61 of the thrust bearing 60. Accordingly, the inner horizontal surface is free from rotation of the nut driving part 50. An inner vertical surface of a part of the housing 10 may be in close contact with an outer ring 71 of the radial bearing 70. Accordingly, the inner vertical surface is also free from the rotation of the nut driving part 50. Accordingly, due to such a structure, the screw driving part 40 is accurately driven forward or backward to respond to an operation of the driving motor 30 so as to operate the brake. In addition, since all components are positioned in a space of which a range has a length smaller than that of the screw driving part 40, a miniaturization and compact design is possible. In FIG. 9, the thrust bearing 60 is formed in a form in which a plurality of rollers 60a are disposed between the upper member 61 and a lower member 40a, and the radial bearing 70 has a structure in which a roller 70a is also disposed between an inner ring 40b and the outer ring 71.

Referring to FIG. 10, a schematic view of the electro-mechanical brake according to one embodiment of the present invention is illustrated. Conventionally, a PCB 20 is installed to be spaced upward from an upper end of a screw driving part 40 so as not to interfere with the screw driving part 40 in the drawing, but in this case, since the PCB 20 is positioned at a lower position than the screw driving part 40, it can be seen that it is very advantageous in terms of reduction of a space. In addition, due to the layout of the bearings, since there is a structure in which an inner surface of the housing 10 may be installed closest to the nut driving part 50, spatial utilization is superior, and thus a compact design is possible.

Meanwhile, referring to FIG. 11, a schematic view of an electro-mechanical brake according to another embodiment of the present invention is illustrated. A difference from the embodiment illustrated in FIG. 10 is that a shape of an adjacent housing 10 is changed. Accordingly, a layout of bearings is changed according to the change in shape of the adjacent housing 10. Based on the drawing, a radial bearing 70 is disposed in an upper portion, and a thrust bearing 60 is disposed in a lower portion. Due to such a change, when a brake is designed, the change may be actively utilized according to a shape of the housing 10 and spatial utilization, and thus positions of the bearings 60 and 70 may also be changed.

Meanwhile, according to another embodiment of the present invention, the present invention may also be applied to a type in which a screw driving part is rotationally driven, and a nut driving part is assembled with a piston and drives a brake while moving forward or backward. That is, the electro-mechanical brake, which is an electro-mechanical brake provided with a pair of brake pads disposed at both sides of a disk, may include a driving motor, a first rotating part assembled with a rotating shaft of the driving motor, a second rotating part rotationally driven while connected to the first rotating part through a driving transmission member, a screw driving part rotationally driven while connected to the second rotating part so that power is transmitted to the second rotating part, and a nut driving part installed outside and engaged with the screw driving part and driven forward or backward according to a rotation direction of the screw driving part so that a piston pushes the brake pads to be in close contact with a disc. In this case, one end of the nut driving part may be assembled with the piston, and the other end thereof may pass through the driving transmission member and be disposed between the first rotating part and the second rotating part to move forward or backward.

In this case, however, since the nut driving part is installed on an outer surface of the screw driving part, a member having a large diameter should be driven forward or backward between the driving transmission member, and thus it may be disadvantageous in terms of reduction of a space, but when a difference in diameter between the nut driving part and the screw driving part is small, such a structure may be meaningfully considered.

According to the above configuration, in an electro-mechanical brake according to the present invention, a size of the electro-mechanical brake can be reduced by designing a forward and backward driving member, which occupies a large volume, to pass through a power transmission part and surrounding components.

Effects of the present invention are not limited to the above-described effects and should be understood to include all possible effects which may be inferred from the detailed description of the present invention or components of the present invention described in the claims.

While embodiments of the present invention have been described above, the spirit of the present invention is not limited to the embodiments proposed in this specification, and the other embodiments may be easily suggested by adding, changing, and removing components by those skilled in the art and will fall within the spiritual range of the present invention.

What is claimed is:

1. An electro-mechanical brake provided with a pair of brake pads disposed at both sides of a disc, the electro-mechanical brake comprising:

a driving motor;

a first rotating part assembled with a rotating shaft of the driving motor;

a second rotating part driven while connected to the first rotating part through a driving transmission member;

a nut driving part rotationally driven while connected to the second rotating part so that power is directly or indirectly transmitted to the second rotating part; and a screw driving part which is installed inside and engaged with the nut driving part and driven forward or backward according to a rotation direction of the nut driving part so that a piston pushes the brake pads to come into close contact with the disc through a member, wherein one end of the screw driving part is assembled with the member, the other end of the screw driving part passes through the driving transmission member and is disposed between the first rotating part and the second rotating part to move forward or backward, a driving gear is fixedly installed on an outer surface of the nut driving part or the screw driving part, and a pinion to be engaged with the driving gear is installed on a lower portion of the second rotating part, wherein a bearing member, including a thrust bearing and a radial bearing, is disposed on the outer surface of the nut driving part to reduce rotational friction with a body of a housing, wherein a jaw portion is formed on the body of the housing, wherein, when a vertical toward the piston is defined as a lower direction and a direction opposite to the lower direction is defined as an upper direction:

the nut driving part includes a thrust bearing lower member integrally formed with and radially protruding from the nut driving part, and the thrust bearing includes a thrust bearing upper member and a plurality of thrust bearing rollers arranged between the thrust bearing upper member and the thrust bearing lower member, an upper surface of the thrust bearing upper member being fixedly in contact with a lower surface of the jaw portion of the body of the housing.

2. An electro-mechanical brake provided with a pair of brake pads disposed at both sides of a disc, the electro-mechanical brake comprising:

a driving motor;

a first rotating part assembled with a rotating shaft of the driving motor;

a second rotating part driven while connected to the first rotating part through a driving transmission member;

a screw driving part disposed radially inside the nut driving part and rotationally driven while being connected to the second rotating part so that power is transmitted to the second rotating part; and a nut driving part surrounding the screw driving part, installed outside and engaged with the screw driving part so as to move forward or backward without rotation according to a rotation direction of the screw driving part so that a piston pushes the brake pads to come into close contact with the disc, wherein one end of the nut driving part is assembled with the piston, the other end of the nut driving part passes through the driving transmission member and is disposed between the first rotating part and the second rotating part to move forward or backward, a driving gear is fixedly installed on an outer surface of the nut driving part or the screw driving part, and a pinion engaged with the driving gear is fixedly installed on a lower portion of the second rotating part.

3. The electro-mechanical brake of claim 1, wherein the first rotating part and the second rotating part are positioned coplanar with each other.

4. The electro-mechanical brake of claim 1, wherein a diameter of the first rotating part is smaller than a diameter of the second rotating part.

5. The electro-mechanical brake of claim 3, wherein the driving transmission member connecting the first rotating part and the second rotating part includes a belt or chain.

6. The electro-mechanical brake of claim 1, wherein a diameter of the driving gear is greater than or equal to a diameter of the second rotating part.

7. The electro-mechanical brake of claim 1, further comprising a tensioner which provides a tension to the driving transmission member.

8. The electro-mechanical brake of claim 1, wherein each of the nut driving part and the screw driving part includes a ball nut and a ball screw.

9. The electro-mechanical brake of claim 1, wherein the driving motor is driven according to an electrical signal generated by a brake pedal.

10. The electro-mechanical brake of claim 1, wherein the nut driving part includes a radial bearing inner ring integrally formed with and radially protruding from the nut driving part, the radial bearing includes a radial bearing outer ring and a plurality of radial bearing rollers arranged between the radial bearing inner ring and the radial bearing outer ring, an outer circumferential surface of the radial bearing outer ring being fixedly in contact with an inner surface of the jaw portion of the body of the housing;

the thrust bearing lower member being disposed upper side than the radial bearing inner ring.

11. The electro-mechanical brake of claim 10, wherein the thrust bearing lower member is disposed vertically adjacent to and directly above the radial bearing inner ring with a gap therebetween.

12. The electro-mechanical brake of claim 11, wherein a protruding length of the thrust bearing lower member from the nut driving part is greater than a protruding length of the radial bearing inner ring from the nut driving part.

13. The electro-mechanical brake of claim 1, wherein the pinion is engaged with the driving gear with a tooth connection without a belt connecting the pinion and the driving gear.

14. An electro-mechanical brake provided with a pair of brake pads disposed at both sides of a disc, the electro-mechanical brake comprising:

a driving motor;

a first rotating part assembled with a rotating shaft of the driving motor;

a second rotating part driven while connected to the first rotating part through a driving transmission member;

a nut driving part rotationally driven while connected to the second rotating part so that power is transmitted to the second rotating part; and a screw driving part installed inside and engaged with the nut driving part and driven forward or backward according to a rotation direction of the nut driving part so that a piston pushes the brake pads to come into close contact with the disc, wherein one end of the screw driving part is assembled with the piston, the other end of the screw driving part passes through the driving transmission member and is disposed between the first rotating part and the second rotating part to move forward or backward, a printed circuit board (PCB) is disposed parallel to the driving transmission member, and a through hole through which the screw driving part or the nut driving part passes is formed in the PCB, wherein a bearing member, including a thrust bearing and a radial bearing, is disposed on an outer surface of the nut driving part to reduce rotational friction with a body of a housing, wherein a jaw portion is formed on the body of the housing, wherein, when a vertical toward the piston is defined as a lower direction and a direction opposite to the lower direction is defined as an upper direction:

the nut driving part includes a thrust bearing lower member integrally formed with and radially protruding from the nut driving part, and the thrust bearing includes a thrust bearing upper member and a plurality of thrust bearing rollers arranged between the thrust bearing upper member and the thrust bearing lower member, an upper surface of the thrust bearing upper member being fixedly in contact with a lower surface of the jaw portion of the body of the housing.

15. The electro-mechanical brake of claim 14, wherein the first rotating part and the second rotating part are positioned coplanar with each other.

16. The electro-mechanical brake of claim 14, wherein a diameter of the first rotating part is smaller than a diameter of the second rotating part.

17. The electro-mechanical brake of claim 14, further comprising a tensioner which provides a tension to the driving transmission member.

18. An electro-mechanical brake provided with a pair of brake pads disposed at both sides of a disc, the electro-mechanical brake comprising:

a driving motor;

a first rotating part assembled with a rotating shaft of the driving motor;

a second rotating part driven while connected to the first rotating part through a driving transmission member;

a screw driving part disposed radially inside the nut driving part and rotationally driven while being connected to the second rotating part so that power is transmitted to the second rotating part; and a nut driving part surrounding the screw driving part installed outside and engaged with the screw driving part and driven-so as to move forward or backward without rotation according to a rotation direction of the screw driving part so that the piston pushes the brake pads to come into close contact with the disc, wherein one end of the nut driving part is assembled with the piston, the other and of the nut driving part passes through the driving transmission member and is disposed between the first rotating part and the second rotating part to move forward or backward, a printed circuit board (PCB) is disposed parallel to the driving transmission member, and a through hole through which the screw driving part or the nut driving part passes is formed in the PCB.

* * * * *